Patented Jan. 19, 1926.

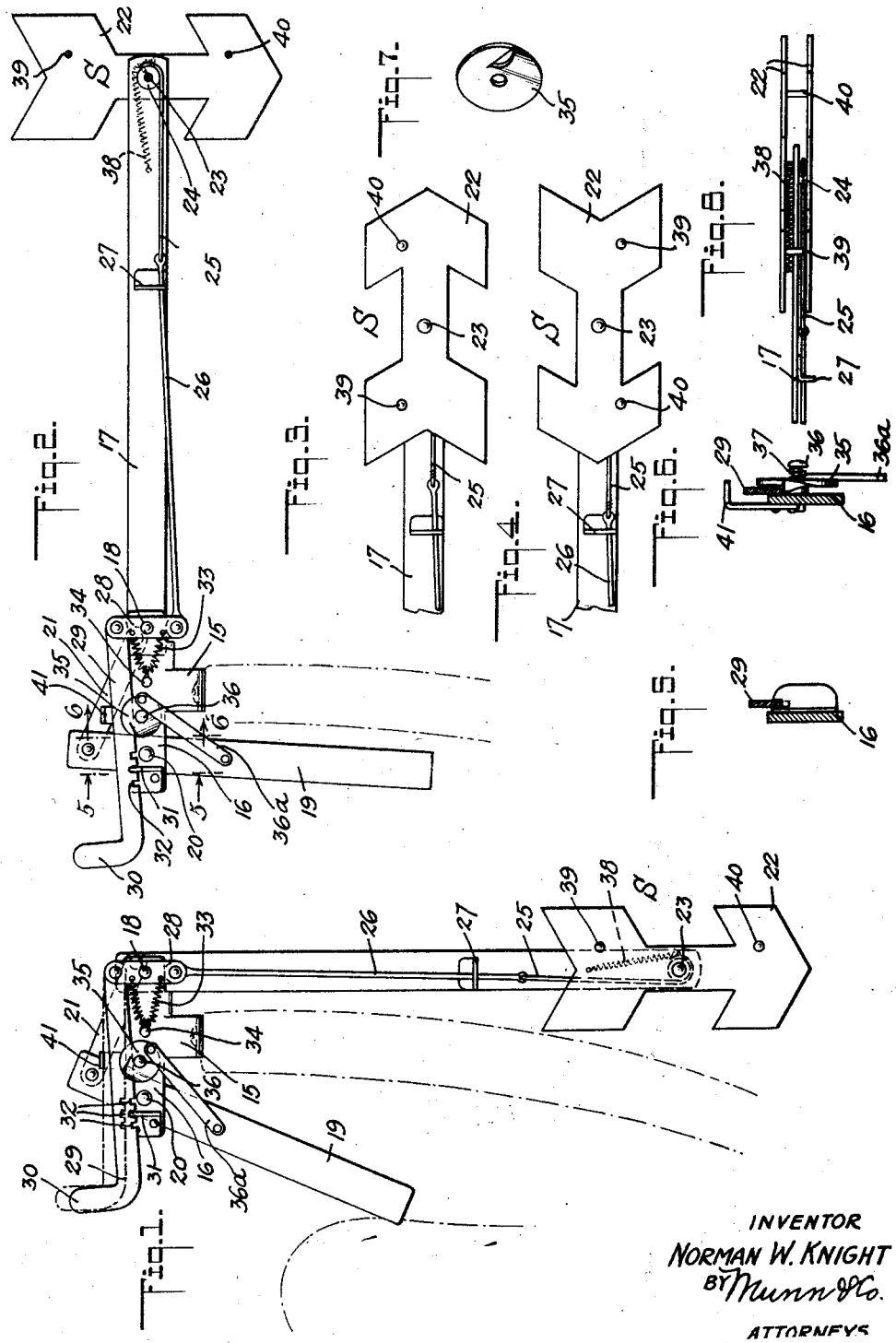

1,570,158

UNITED STATES PATENT OFFICE.

NORMAN W. KNIGHT, OF LOS ANGELES, CALIFORNIA.

DIRECTION SIGNAL.

Application filed March 1, 1924. Serial No. 696,390.

*To all whom it may concern:*

Be it known that I, NORMAN W. KNIGHT, a citizen of the United States, and a resident of Los Angeles, in the county of Los Angeles and State of California, have invented certain new and useful Improvements in Direction Signals, of which the following is a specification.

My invention relates to direction signals for motor vehicles, and a purpose of my invention is the provision of a durable, simple and inexpensive direction signal including a semaphore adapted to be manually moved through suitable mechanism to any one of several signaling positions and in a manner to visibly indicate the intentions of the driver of a motor vehicle.

I will describe only one form of direction signal embodying my invention, and will then point out the novel features thereof in claims.

In the accompanying drawings:

Figure 1 is a view showing in rear elevation one form of direction signal embodying my invention;

Figure 2 is a view similar to Figure 1, with the signal in signaling position;

Figures 3 and 4 are fragmentary views showing in side elevation the other two positions which the semaphore embodied in the signal is capable of occupying;

Figures 5 and 6 are vertical sectional views taken on the lines 5—5 and 6—6, respectively, of Figure 2;

Figure 7 is a detail fragmentary view of the cam embodied in the signal shown in Figures 1 and 2;

Figure 8 is a fragmentary top plan view of a portion of the signal arm and semaphore embodied in the signal.

Similar reference characters refer to similar parts throughout the several views of the drawing.

Referring specifically to the drawings, my invention in its present embodiment comprises a support including a vertical section 15 which is adapted to be secured to the upper edge of the body of a motor vehicle, as indicated in dot and dash lines in Figures 1 and 2, and a horizontal portion 16 arranged to extend transversely of the body edge and of sufficient length to dispose its opposite ends at opposite sides of the body. An arm 17 is pivoted on the horizontal portion 16 at the point indicated at 18 so as to normally occupy the vertical or non-signaling position shown in Figure 1, and to be moved to horizontal or signaling position. Means adapted to be operated by the leg of the driver of the motor vehicle is provided for moving the arm 17 from non-signaling to signaling position, and this means in the present instance comprises a lever 19 fulcrumed on the horizontal portion 16 at the point indicated at 20 and operatively connected to the arm at a point above the pivot 18 through a link 21. By this connection the lever 19 normally occupies an inclined position shown in Figure 1, and is adapted to be moved to the vertical position shown in Figure 2 by lateral movement of the leg, as will be understood.

The arm 17 carries a semaphore designated generally at S, and made up of two arrow shaped blades 22 fixed to a pintle 23 journaled in the outer end of the arm 17. Fixed upon the pintle is a grooved pulley 24 to which is fixed one end of a spindle member 25. Secured to the opposite end of the member 25 is a rod 26 slidable through an ear 27 secured to the arm 17 and connected to the lower end of a link 28 fulcrumed at the point 18 and pivotally connected to a latching arm 29. The arm 29 is provided with an upright extension 30 which is adapted to be gripped in manipulating the arm to cause a latch finger 31 to engage within any one of three notches 32 formed in the arm. A spring 33 is secured at its ends to the link 28 at opposite sides of the pivot 18, while its intermediate portion is secured to the member 16 at the point indicated at 34. This spring operates to normally urge the link to the perpendicular position shown.

The cam 35 is rotatably mounted on a pintle 36 carried by the member 16, and this cam is adapted to be rotated to engage and lift the arm 29 upon actuation of the lever 19 through a link 36ª. The construction of the cam 35 is clearly shown in Figure 7, and this cam is normally urged in the direction of the arm 29 through a spring 37 (Figure 6). A second spring 38 is secured to the pintle 23 so as to normally urge the semaphore S to the vertical position shown in Figure 1, such position being defined by a stop pin 39 arranged between the blades 22. A second stop pin 40 is arranged between the blades and is adapted to engage the arm 17 when the semaphore is in the position shown in Figure 4.

The operation of the direction signal is as follows:

In the normal position of the signal the arm 17 is suspended at the side of the car body, and the operating lever 19 spaced from the inner side of the car so as to be within easy reach of the leg of the driver. If it is desired to give a "stop" indication, the lever 19 is forced from the position shown in Figure 1 to that shown in Figure 2, thereby swinging the arm 17 to horizontal position and with it the semaphore S. As the arm 17 moves to horizontal position, the link 18, being substantially stationary, causes the flexible member 25 to unwind from the member 24, thereby rotating the pintle 23 to swing the semaphore to the perpendicular position shown in Figure 2. As long as the lever 19 is maintained in the position shown in Figure 2, the arm 17 will occupy horizontal position and the semaphore perpendicular position. However, as soon as the lever 19 is released the arm 17 will gravitate to vertical position. During the return of the arm 17, the spring 38 operates to swing the semaphore to the position shown in Figure 1.

If it is desired to give a right or left hand turn indication, the semaphore can be caused to assume either of the positions shown in Figures 3 and 4 by an adjustment of the arm 29. For example, to secure a right hand turn indication, the arm 29 is pulled rearwardly so that the latch member 31 can engage within the first notch 32. The movement of the arm is against the tension of the spring 33 because the link 18 is swung to retract its upper end and advance its lower end. With the link in this new position the rod 26 is advanced in the direction of the semaphore so as to allow the spring 28 to maintain the semaphore in the position shown in Figure 1. Consequently, when the arm 17 is swung to horizontal position the semaphore will occupy the position shown in Figure 3, thus indicating a right hand turn.

Upon the return of the arm 17 to vertical position the cam 35, which has been rotated during the movement of the lever 19 from the position shown in Figure 1 to that shown in Figure 2, will be rotated in the opposite direction to lift the arm 29 free of the latch member 31, thereby allowing the spring 33 to return the link 18 to perpendicular position, and with it the arm 29, the latter returning to the normal position shown in Figure 2, in which the latch member engages within the center notch. The upward movement of the arm 29 is limited by means of a lip 41 secured to the member 16. With the link returned to normal position it will be clear that when the arm 17 is again raised to horizontal position the semaphore will be moved to the stop indicating position shown in Figure 2.

From this operation it will be clear that irrespective of the adjustment of the arm 29 to cause the semaphore to occupy any predetermined position when the arm 17 is in horizontal position, the succeeding operation of the signal will cause the semaphore to assume a stop indicating position. This mode of operation is of great advantage in actual practice because, should the driver fail to adjust the lever 29 prior to actuating the signal, a "stop" indication will be given, and not a right or left hand turn indication.

Although I have herein shown and described only one form of direction signal embodying my invention, it is to be understood that various changes and modifications may be made herein without departing from the spirit of the invention and the spirit and scope of the appended claims.

What is claimed is:

1. A direction signal comprising an arm normally occupying a non-signaling position and adapted to be moved to a signaling position, a semaphore movable on the arm to occupy various signaling positions, adjustable means by which the semaphore is moved to any desired signaling position upon movement of the arm from non-signaling to signaling position, and means automatically controlling the adjustable means to cause the semaphore to occupy a predetermined signaling position upon a succeeding movement of arm from non-signaling to signaling position only when the adjustable means has not been previously adjusted to cause the semaphore to occupy any other than the predetermined position.

2. A direction signal comprising a pivoted signal arm, a semaphore turnable on said arm and means operable by the movement of the arm for turning the semaphore relatively thereto for selected predetermined distances and including a support and a rod pivotally connected at one end to the semaphore and pivotally connected at its opposite end to the support at a point offset from the pivotal point of the arm.

3. A direction signal comprising a pivoted signal arm, a semaphore turnable on said arm and means operable by the movement of the arm for turning the semaphore relatively thereto for selected predetermined distances and including a support adapted to be adjustably secured in selected different positions, a rod pivotally connected at one end to the semaphore and pivotally connected at its opposite end to the support at a point offset from the pivot of the arm.

4. A direction signal comprising a pivoted signal arm, a semaphore turnable on said arm and means operable by the movement of the arm for turning the semaphore relatively thereto for selected predetermined distances and including a support and an attenuable element connected at one end to the semaphore and pivotally connected at its opposite end to the support at a point offset from the pivot of the arm.

5. A direction signal comprising a pivoted signal arm, a semaphore turnable on said arm and means operable by the movement of the arm for turning the semaphore relatively thereto for selected predetermined distances and including a support adapted to be adjustably secured in a plurality of selected positions, a rod carried by the arm and pivotally connected at one end to the support at a point offset from the pivot of the arm and an attenuable element connected to the semaphore for turning the same and having its opposite ends connected to the rod and to the arm.

6. A direction signal comprising a support adapted to be secured to a vehicle body, an arm pivoted on the support to normally occupy a vertical position at the outer side of the body, a lever fulcrumed on the support and disposed in inclined position at the inner side of the body when the arm is in vertical position, a link connection between the lever and arm for moving the arm to horizontal position when the lever is forced in the direction of the body, a pintle journaled in the arm, a semaphore secured to the pintle, stop pins on the semaphore for limiting the movement thereof in two directions, a spring for urging the semaphore to a predetermined position, a flexible member connected to the pintle, a link fulcrumed on the support and connected to the flexible member, a notched arm pivotally connected to the link, a spring connected to the support and to the link at opposite sides of its pivot, a latch member secured to the support and adapted to engage within any one of the notches of said arm, a cam rotatably mounted on the support and urged toward the second arm, and a link connecting the lever with said cam, whereby when the lever is returned to the normal position the cam will be rotated to lift the second arm free of said latch member for the purpose described.

7. A direction signal as embodied in claim 6, wherein the cam comprises a disk having an outstruck portion.

NORMAN W. KNIGHT.